INVENTOR:
JOHN W. GREER
ATTORNEYS

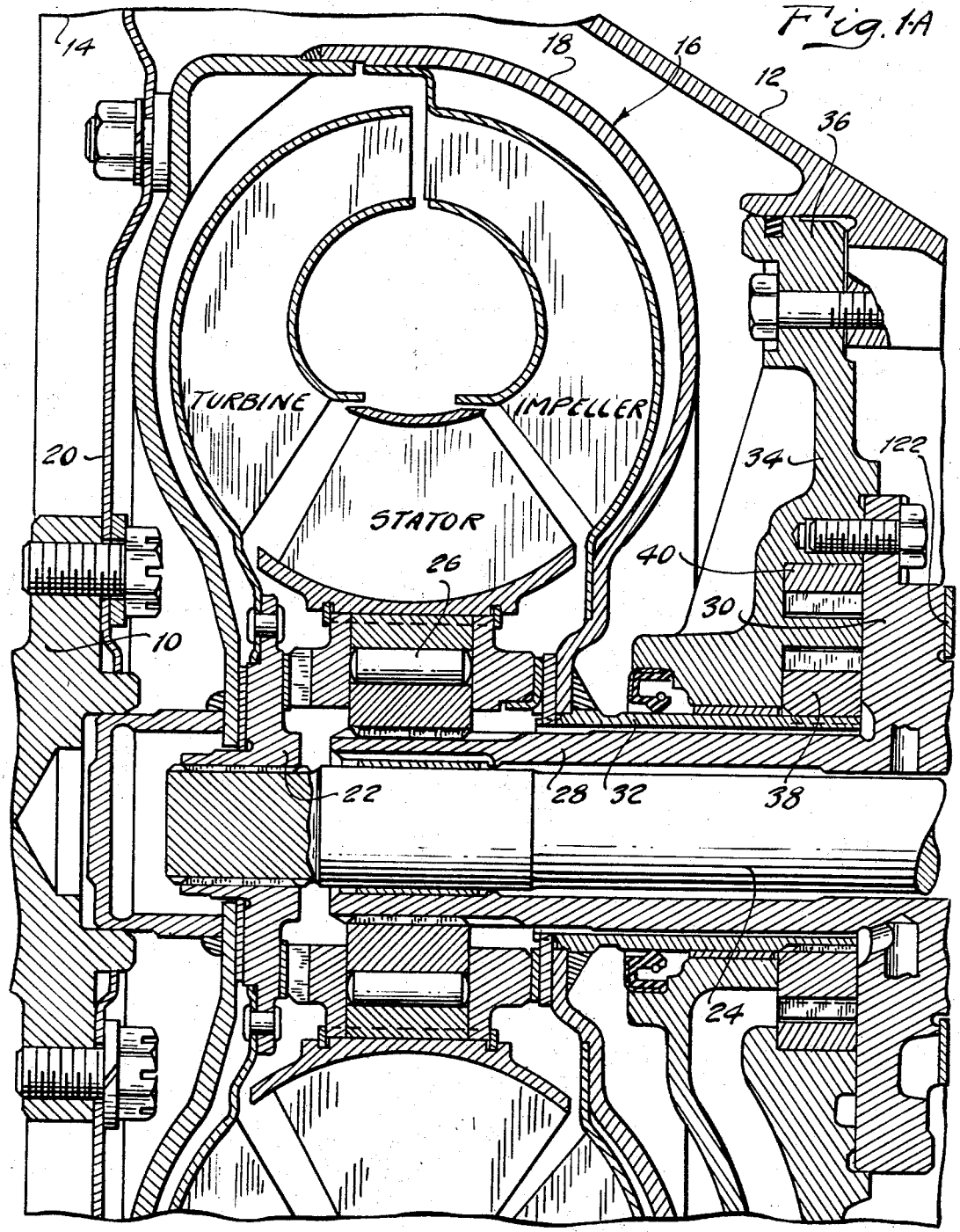

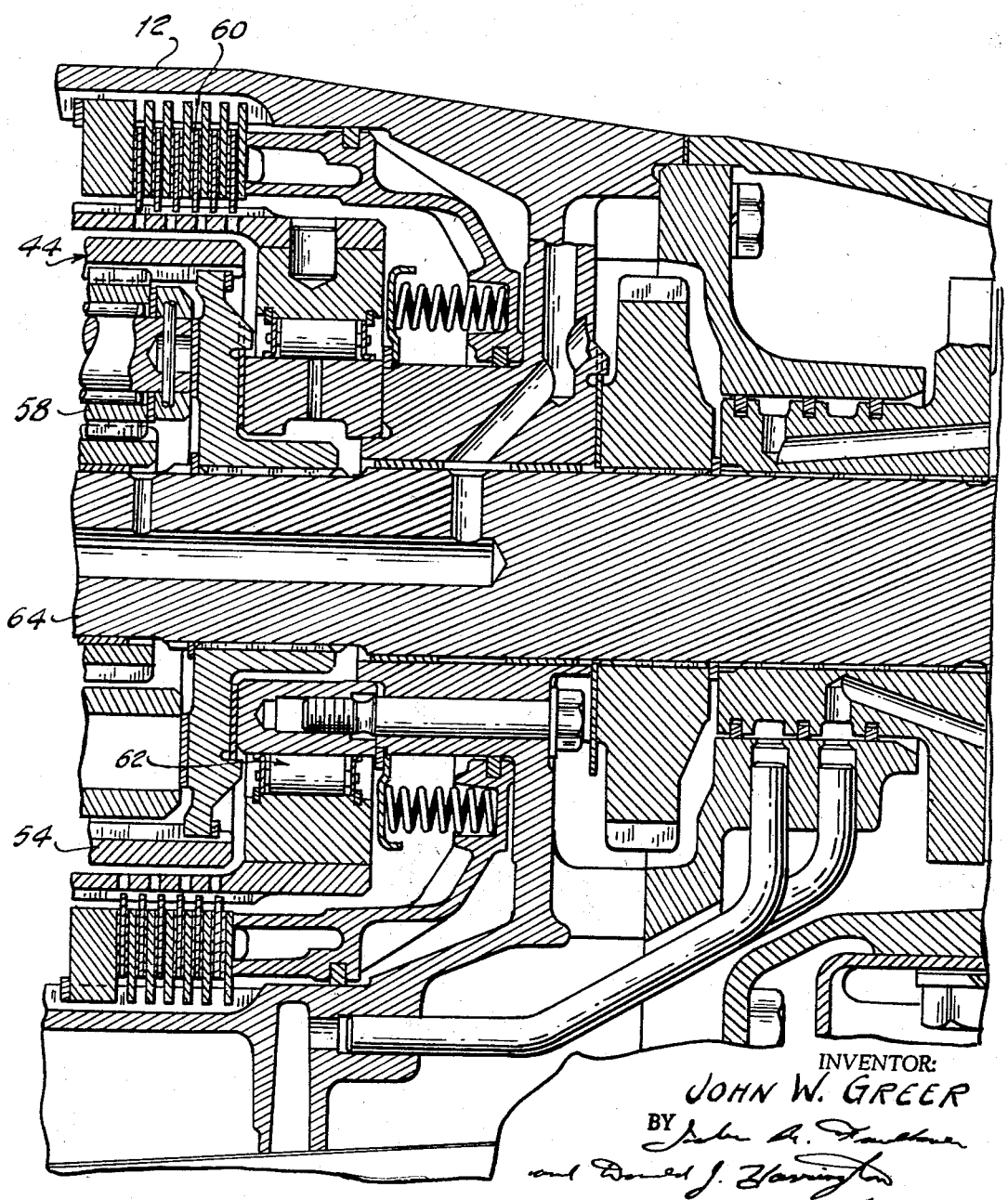

INVENTOR:
JOHN W. GREER
ATTORNEYS

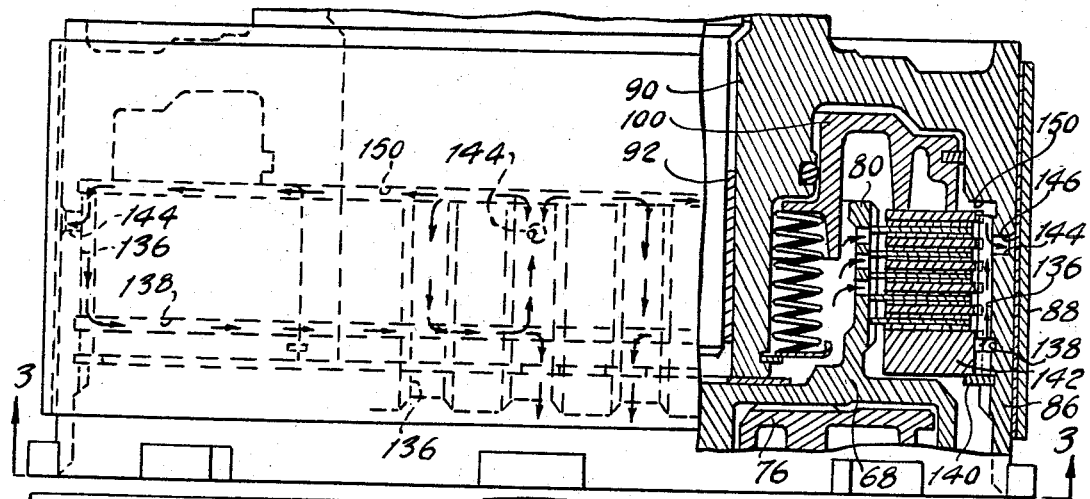
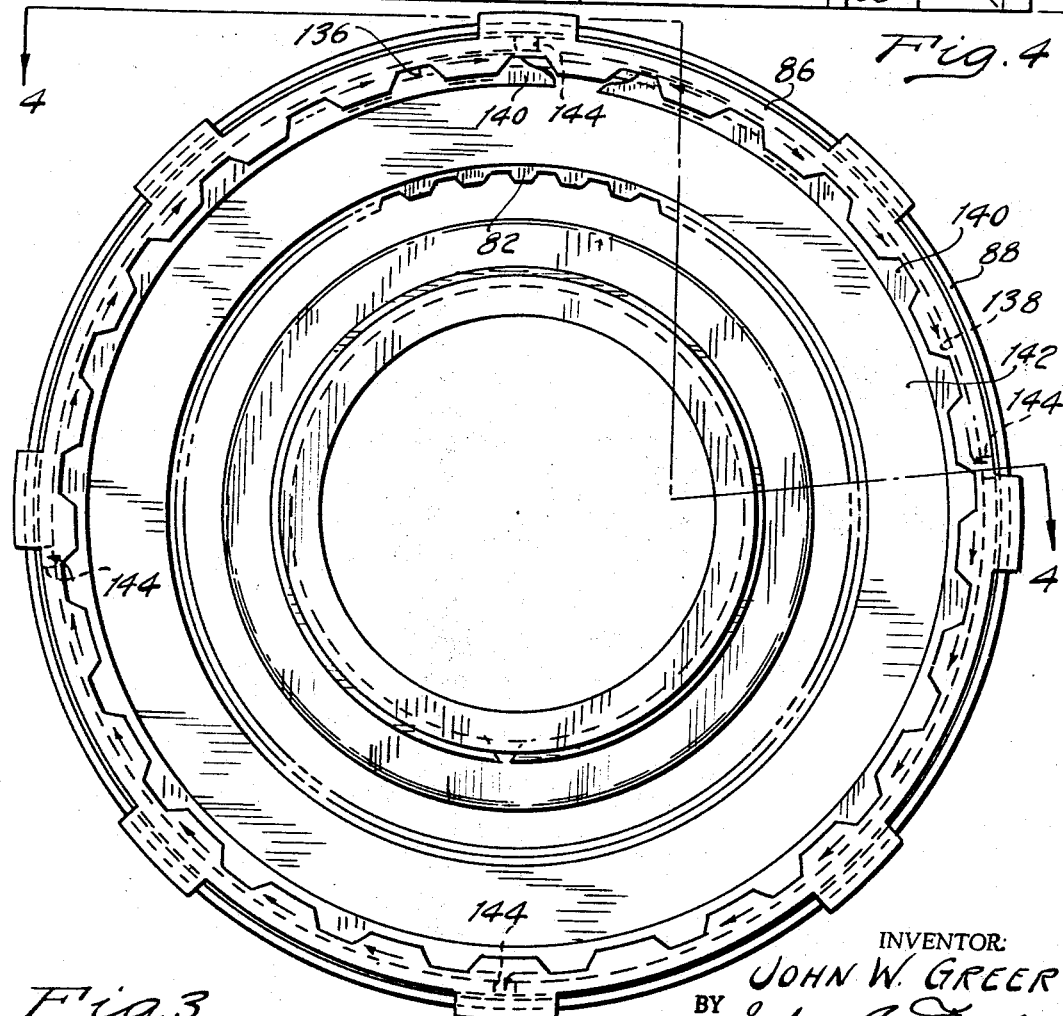

United States Patent Office 3,321,999
Patented May 30, 1967

3,321,999
MULTIPLE DISC FRICTION CLUTCH AND BAND BRAKE CONSTRUCTION
John W. Greer, Birmingham, Mich., assignor to Ford Motor Company, Dearborn, Mich., a corporation of Delaware
Filed Oct. 24, 1965, Ser. No. 504,789
11 Claims. (Cl. 74—763)

My invention relates generally to friction clutch and brake mechanisms, and more particularly to a multiple disc clutch and friction brake band construction which forms a part of a multiple speed ratio power transmission mechanism having relatively movable gear elements. The clutch and brake construction of my invention is capable of controlling the relative motion of the gear elements to establish plural torque delivery paths extending from a driving member to a driven member in an automotive vehicle driveline.

In a preferred form of my invention I have provided a planetary gear system capable of establishing three forward driving speed ratios and a single reverse driving speed ratio. Torque is delivered to a first power input element of the gearing through a selectively engageable, forward drive, friction clutch. Intermediate speed ratio is obtained by anchoring one of the gear elements so that it can act as a reaction point. The forward drive clutch is engaged during operation in each forward driving speed ratio.

The brake for anchoring the reaction gear element during intermediate speed ratio operation comprises a brake drum that is journaled rotatably on a stationary sleeve. The sleeve is connected to a stationary transmission housing. A friction brake band surrounds the drum. The band can be operated selectively to anchor the drum by means of a fluid pressure operated brake servo.

The brake drum defines an annular clutch servo cylinder within which is positioned an annular piston. The inner periphery of the drum is splined to permit a driving connection between the drum and externally splined friction discs for a multiple disc clutch assembly. Internally splined friction discs are carried by an externally splined clutch element which in turn is connected to the power input portion of the forward drive friction clutch structure.

If the transmission mechanism is to be adapted for high driving torque capacities, the brake band must have sufficient frictional area to provide the necessary torque reaction. When the width of the band is increased to provide the necessary area, a lubrication problem is presented since lubrication oil must be distributed throughout the entire friction surface of the band. In conventional arrangements the lubrication oil is distributed to the band friction surface from either axial end of the band. For this reason it becomes difficult to lubricate the center region of the band. Premature band failure thus may be caused.

I have overcome this deficiency in prior art constructions by providing an improved lubrication oil distributing passage arrangement for obtaining complete lubrication of the friction clutch discs as well as the entire friction surface of the brake band surrounding the brake drum. In this way braking capacity can be increased without risking band failure and without the necessity for using an excessively wide brake band or a band of excessive diameter. A substantial space saving thus is realized.

The provision of an improved clutch and brake construction of the type above set forth being an object of my invention, it is a further object of my invention to provide a clutch and brake construction with an improved lubrication system that forms a composite part of the clutch and brake assembly.

It is a further object of my invention to provide a lubrication system for a clutch and brake assembly of the type above set forth which can be applied readily to friction clutch and brake constructions in automotive vehicle power transmission mechanisms of known design.

It is a further object of my invention to provide a lubrication system for a clutch and brake assembly of the type above set forth in which a continuous flow of lubrication oil through the friction surfaces of the clutch and the brake is maintained without the necessity for using an auxiliary lubrication pump for this purpose. I contemplate that the centrifugal head established by rotation of the rotary clutch portions can be utilized to establish a pressure differential capable of maintaining a continuous flow of lubrication fluid across the friction surfaces of the brake band.

For the purpose of describing a preferred embodiment of my invention, reference will be made to the accompanying drawings, wherein:

FIGURES 1A, 1B and 1C show in cross sectional form a transmission assembly embodying the improvements of my invention;

FIGURE 3 shows the interior of the brake drum of FIGURE 2 as viewed from the plane of section line 3—3 of FIGURE 1B; and FIGURE 4 is a partial cross sectional view taken along the plane of section line 4—4 of FIGURE 3.

Figure 1B:
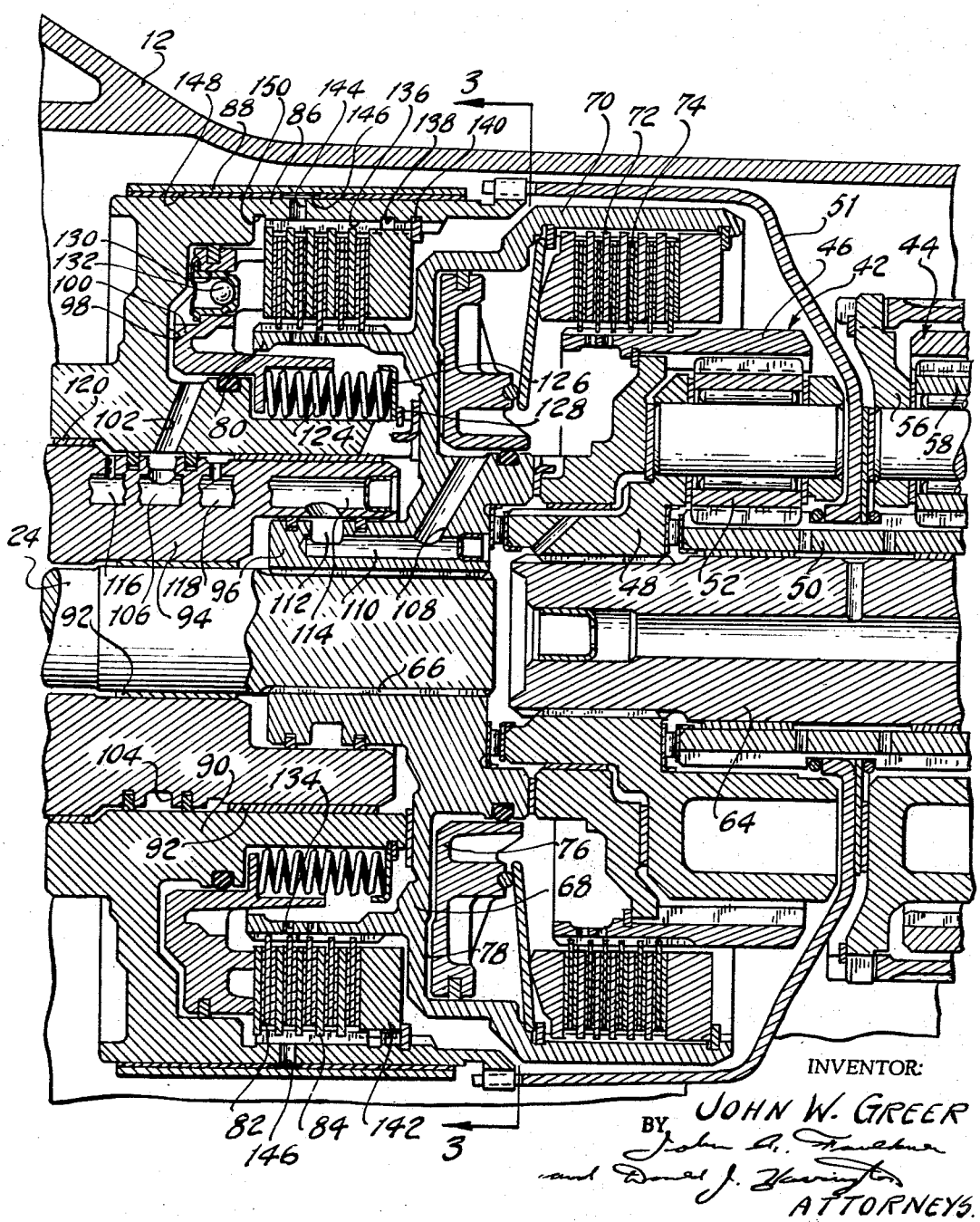

In FIGURE 1 numeral 10 designates the crankshaft of an internal combustion engine in an automotive vehicle driveline. Numeral 12 designates a stationary transmission housing which can be bolted at its margin 14 to the engine block of the vehicle engine. The left-hand end of the housing forms a bell-shaped converter enclosure within which is situated a hydrokinetic torque converter 16. The converter includes an impeller having a shell 18 which is drivably connected to the crankshaft 10 by means of a driveplate 20. The converter includes also a bladed turbine having a hub 22 which is splined to turbine shaft 24. A bladed stator is situated between the flow exit section of the turbine and the flow entrance section of the impeller. It is mounted by means of an overrunning brake 26 upon stationary sleeve shaft 28 which extends from and is formed integrally with center support wall 30.

The impeller includes a hub in the form of a sleeve shaft 32 which is journaled for rotation within a transverse wall 34. The wall 34 is secured at its periphery 36 to the transmission housing 12. Wall 34 and support 30 define a pump chamber within which are mounted positive displacement pump elements in the form of gears 38 and 40. This pump forms a fluid pressure source for the clutch or brake servo pressure.

The transmission mechanism includes a pair of simple planetary gear units 42 and 44. Gear unit 42 includes a ring gear 46, a carrier 48, a sun gear 50 and planet pinions 52 journaled on the carrier 48 in meshing engagement with the ring gear 46 and the sun gear 50. Gear unit 44 includes a ring gear 54, a carrier 56 and planet pinions 58 carried by the carrier 56. Sun gear 50 is common to both planetary gear units 42 and 44. Pinions 58 mesh with ring gear 54 and sun gear 50.

A fluid pressure operated friction disc brake 60 is adapted to anchor selectively the carrier 56. An overrunning brake 62 complements the action of the friction disc brake 60 to anchor carrier 56 against rotation in one direction during operation in the forward drive, low speed ratio range.

Ring gear 54 is connected directly to power output shaft 64. Carrier 48 also is connected to power output shaft 64.

Turbine driven shaft 24 is connected by means of a spline 66 to compound clutch member 68. It includes an internally splined clutch portion 70, which carries externally splined clutch discs 72. These discs are situated in interdigital relationship with respect to internally splined clutch discs 74 carried by ring gear 46.

A fluid pressure operated clutch servo is provided for applying the clutch disc assembly shown in part at 72 and 74. This servo includes an annular piston 76 positioned within an annular cylinder 78. The clutch member 68 includes an externally splined clutch element 80 which carries internally splined clutch discs 82. These are situated in interdigital relationship with respect to externally splined clutch discs 84 supported by the internally splined periphery of brake drum 86. A drive shell 51 connects drivably the drum 86 to the sun gear 50. A friction brake band 88 surrounds the drum 86. It may be applied and released by means of a fluid pressure operated servo in the usual fashion.

Drum 86 includes a hub 90 which is journaled by means of a bushing 92 on a sleeve extension 94 of the member 30. The clutch member 68 includes an extension 96 which is rotatably received with a pilot opening formed in the end of the extension 94.

Drum 86 defines an annular cylinder 98. Annular piston 100 is received within cylinder 98 and cooperates therewith to define a fluid pressure working chamber which is in fluid communication with pressure feed passage 102. This passage communicates with annular groove 104 formed in extension 94 and with an axially extending clutch pressure delivery passage 106 formed in the extension 94. A feed passage for the clutch servo working chamber defined by cylinder 78 and piston 76 is shown at 108. It communicates with an axially extending passage 110 which in turn communicates with annular groove 112 formed in the extension 96. This groove 112 in turn communicates with axially extending pressure passage 114 formed in the extension 94. Passage 114 as well as passage 106 is supplied with working pressure by means of an automatic control valve system, not shown. The source of the pressure is the pump shown in part at 38 and 40.

Lubrication oil passages 116 and 118 are formed in the extension 94. They communicate with radial lubrication oil ports to distribute lubricating oil to bushing 92 and to another bushing 120, which journals drum 86. Lubricating oil is distributed also to a thrust washer 122 located between the drum 86 and support member 30.

A piston return spring 124 is situated between the piston 100 and a spring seat in the form of an annular ring 126. Ring 126 is anchored to the hub 90 by means of a snap ring 128.

When pressure is applied to the annular cylinder 98, the piston 100 causes frictional engagement of the friction discs 82 and 84 thereby establishing a driving connection between sun gear 50 and turbine driven shaft 24. When both the multiple disc clutches shown in part at 82 and 84 and at 72 and 74 are engaged and when the brakes are released, the transmission system is conditioned for direct drive, high speed ratio operation. If the clutch shown at 72 and 74 is applied and the clutch shown in part at 82 and 84 is released, and if brake band 88 is released, the transmission system is conditioned for low speed ratio operation with the carrier 56 acting as a reaction point. The carrier 56 is anchored, as explained previously, by the overrunning brake 62. If coast braking is desired, the carrier 56 can be anchored by the multiple disc brake assembly 60.

If the multiple disc clutch assembly shown in part at 72 and 74 is applied, and if the multiple disc clutch assembly shown in part at 82 and 84 is released, intermediate speed ratio operation can be achieved by applying brake band 88. Multiple disc brake 60 is released under these conditions. Thus the sun gear 50 acts as a reaction point for the gearing as torque is delivered to the ring gear 46. Torque multiplication is achieved by the planetary gear unit 42 while the gear unit 44 is nonfunctional.

Reverse drive is obtained by releasing the multiple disc clutch assembly shown in part at 72 and 74 and applying the other clutch disc assembly shown in part at 82 and 84. Brake band 88 is released and the multiple disc brake assembly 60 is applied. Thus turbine torque is delivered to the sun gear 50. As carrier 56 acts as a reaction point, the ring gear 54 and the power output shaft 64 are driven in a reverse direction.

Piston 100 is formed with an opening 130 located at a radially outward location. Opening 130 receives a hollow cage for a centrifugally responsive exhaust valve 132. This valve cooperates with a valve seat formed in its associated cage to provide communication between the interior of cylinder 98 and the low pressure exhaust region when working pressure in the cylinder 98 is relieved. This prevents a build-up of centrifugal pressure behind the piston 100 when the clutch disengages thereby avoiding partial engagement of the clutch discs 82 and 84 under the influence of the centrifugal pressure build-up.

Clutch element 80 is formed with a plurality of lubrication pump ports 134. These ports receive lubricating oil from the low pressure exhaust region and then transfer it radially outwardly past the discs 82 and 84 as the clutch structure is rotated. The discs 82 and 84, by reference, are grooved to permit radial flow of lubricating oil which is received by the ports 134.

The spline grooves, which are best seen in FIGURE 3 at 136, receive the lubricating oil that flows in a radially outward direction past the discs 82 and 84. The lubricating oil then flows axially along the spline grooves 136 and is collected in an annular oil transfer groove 138 formed in the interior of the drum 86. The groove 138 establishes fluid communication between each of the separate spline grooves 136.

The ends of the spline grooves 136 are sealed by a snap ring 140. The snap ring groove within which snap ring 140 is situated is of sufficient depth to permit the snap ring to cover the end openings for each of the grooves 136. The snap ring 140 also serves as a reaction point for the clutch assembly since it resists axial displacement of a clutch reaction ring 142 and the adjacent discs 84 and 82 when the clutch disc assembly is applied.

Figure 2:
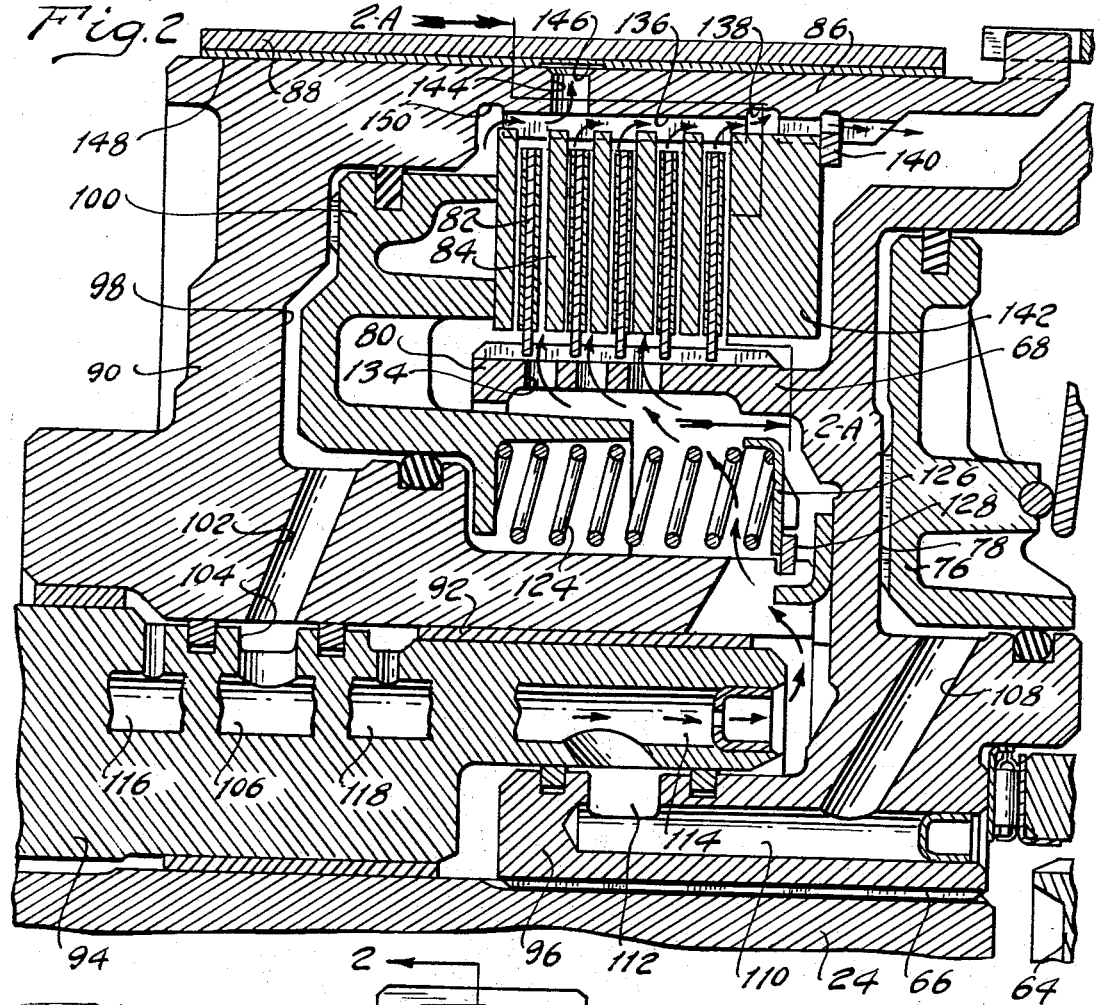
FIGURE 2 is an enlarged sectional view, taken along section line 2—2 of FIGURE 2A, showing the combined clutch and brake arrangement of FIGURE 1B.
Figure 2A:
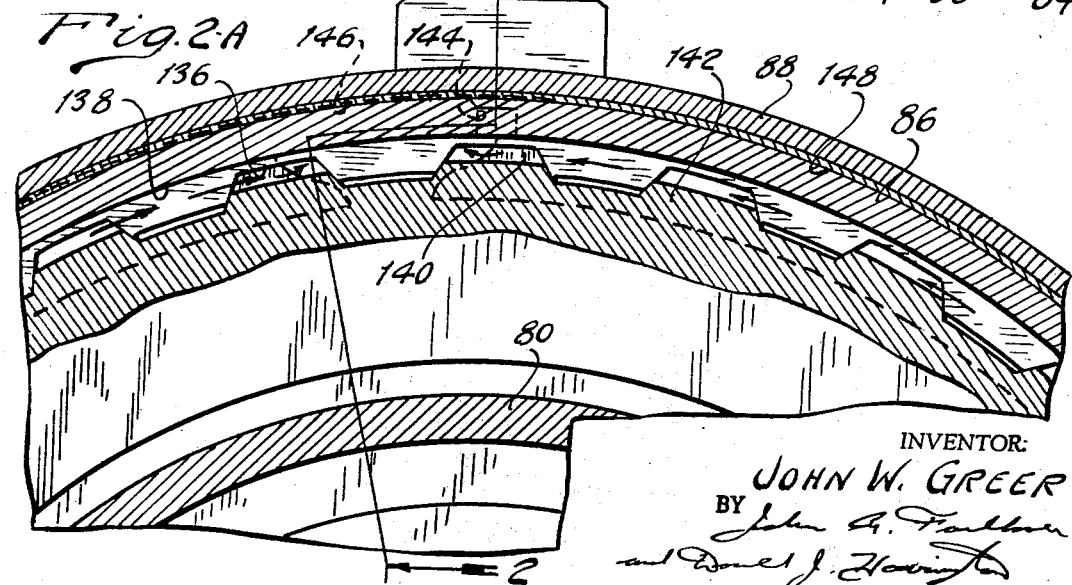
FIGURE 2A is a sectional view taken along section line 2A—2A of FIGURE 2.

As best seen in FIGURES 1B, 2 and 4, the drum 86 is formed with radial ports 144, preferably four in number, each of which communicates with one of the grooves 136. The ports 144 are centrally situated with respect to the surrounding brake band 88. The center of the brake band 88 is formed with an internal groove 146. This groove is machined in the friction material 148 which surrounds the inner periphery of the steel band 88. The groove 146 receives oil from each of the ports 144 and allows circumferential distribution of lubricating oil to the friction surfaces of the band.

The lubricating oil that passes radially outwardly across the discs 82 and 84 rotates during operation of the clutch thereby permitting development of a centrifugal pressure head. This causes lubricating oil to flow under pressure through the grooves 136. The ends of the grooves are sealed by the snap ring 140 thereby allowing a pressure build-up to take place. As best seen in FIGURE 3, the ends of the snap ring may be arranged so that the gap between the ends of the snap ring registers with the ends of one of the splines thereby reducing the effective area through which the lubrication oil can be leaked into the low pressure exhaust region. This reduced flow area acts as a flow restricting orifice that permits the development of a back pressure in the spline grooves 136.

The interior of the drum 86 is formed also with another oil collecting groove 150. This groove functions in the same fashion as groove 138 since it connects the spline grooves together so that they are in fluid communication with each other. During operation of the transmission mechanism in the low speed ratio discs 82 and 84 move relative to each other since they are disengaged. This permits free passage of lubricating oil in a radially outward direction so that there is an abundance of oil in the spline grooves 136. Thus the lubricating oil distributed to the friction surfaces of the brake band is sufficient to condition the brake band for a subsequent speed ratio change from the low speed ratio to the high speed ratio. As break band 88 becomes applied to establish such a speed ratio change, lubrication oil is available thereby permitting the band to be phased in gently. A predetermined amount of brake band slippage can be employed without the risk of band failure. This makes a speed ratio transition take place relatively smoothly. It is this speed ratio change from low speed ratio to the intermediate speed ratio that imposes the highest load upon the brake band 88.

During a speed ratio change from the high speed, direct drive ratio to the intermediate speed ratio, the brake band 88 is applied as the clutch discs 82 and 84 are released in timed sequence. Lubrication oil is available to the friction surfaces of the band 88 just prior to such a downshift since the lubricating oil is permitted to flow past the grooves in the engaged discs 82 and 84.

Under both conditions of operation—that is, just prior to a 1–2 upshift and just prior to a 3–2 downshift—lubricating oil flows under pressure through the splined grooves 136 and through the ports 146 to the friction surfaces of the band. Communication between each of the separate grooves 136 and the ports 146 is established by both the annular groove 150 and the annular groove 138.

Having thus described a preferred form of my invention, what I claim and desire to secure by U.S. Letters Patent is:

1. In a power transmission system having relatively movable gear elements adapted to establish plural torque delivery paths between a driving member and a driven member, a multiple disc clutch assembly and a brake band assembly, said clutch assembly and said brake assembly having a common drum, clutch means for delivering driving torque from said driving member to one element of said gearing, another element of said gearing being connected to said drum, an externally splined clutch element connected to said driving member, first clutch discs carried by said clutch element, internal spline grooves formed in said drum, second clutch discs carried by said splined grooves in interdigital relationship with respect to said first clutch discs, a friction brake band surrounding said drum, lubrication oil ports formed in said clutch element thereby admitting lubricating oil to the region of said discs, an oil collecting annular groove formed in said drum and establishing fluid communication between said splined grooves, and a lubrication oil port extending radially through said drum from one of said splined grooves to a central region of said brake band.

2. In a power transmission system having relatively movable gear elements adapted to establish plural torque delivery paths between a driving member and a driven member, a multiple disc clutch assembly and a brake band assembly, said clutch assembly and said brake assembly having a common drum, one element of said gearing being connected to said drum, an externally splined clutch element connected to said driving member, first clutch discs carried by said clutch element, spline grooves formed in said drum, second clutch discs carried by said splined grooves in interdigital relationship with respect to said first discs, a brake band having a friction surface surrounding said drum, lubrication oil ports formed in said clutch element thereby admitting lubricating oil to the region of said discs, an oil collecting annular groove formed in said drum and establishing fluid communication between said splined grooves, and a lubrication oil port extending radially through said drum from one of said splined grooves to a central region of said brake band, an oil distributing groove formed in the central region of said brake band and communicating with said lubricating oil ports thereby accommodating distribution of lubricating oil over the friction surface of said brake band.

3. In a power transmission system having relatively movable gear elements adapted to establish plural torque delivery paths between a driving member and a driven member, a multiple disc clutch assembly and a brake band assembly, said clutch assembly and said brake assembly having a common drum, clutch means for delivering driving torque from said driving member to one element of said gearing, another element of said gearing being connected to said drum, an externally splined clutch element connected to said driving member, internally splined clutch discs carried by said clutch element, internally splined grooves formed in said drum, externally splined clutch discs carried by said splined grooves in interdigital relationship with respect to said internally splined clutch discs, a brake band having a friction surface surrounding said drum, lubrication oil ports formed in said clutch element thereby admitting lubricating oil to the region of said discs, an oil collecting annular groove formed in said drum and establishing fluid communication between said splined grooves, and a lubrication oil port extending radially through said drum from one of said splined grooves to a central region of said brake band, and a second oil collecting groove formed in the interior of said drum, each of said grooves establishing fluid communication between said splined grooves, said lubricating oil port being situated intermediate said oil collecting grooves.

4. A clutch and brake assembly for use in a power transmission mechanism having gear elements capable of establishing plural torque delivery paths between a driving member and a driven member, a rotatable drum connected to one of said gear elements, a clutch member connected to said driving member, first clutch discs carried by said clutch member, second clutch discs carried within said drum, said discs being situated in interdigital relationship, fluid pressure operated servo means for engaging said discs to establish a driving connection between said one gear element and said driving member, axial grooves formed in said drum, an annular oil collecting groove formed in said drum and establishing fluid communication between said axial grooves, means for distributing lubricating oil to said discs whereby lubricating oil is forced under the influence of centrifugal pressure in a radially outward direction past said discs, a lubricating oil port formed in said drum and communicating with one of said axial grooves, and a brake band having a friction surface surrounding said drum, the lubricating oil passing through said port being adapted to lubricate the friction surface of said band.

5. A clutch and brake assembly for use in a power transmission mechanism having gear elements capable of establishing plural torque delivery paths between a driving member and a driven member, a rotatable drum connected to one of said gear elements, a clutch member connected to said driving member, first clutch discs carried by said clutch member, second clutch discs carried within said drum, said discs being situated in interdigital relationship, fluid pressure operated servo means for engaging said discs to establish a driving connection between said one gear element and said driving member, axial grooves formed in said drum, an annular oil collecting ring formed in said drum and establishing fluid communication between said axial grooves, means for distributing lubricating oil to said discs whereby lubricating oil is forced under the influence of centrifugal pressure in a radially outward direction past said discs, a lubricating oil port formed in said drum and communicating with one of said axial grooves, a friction brake band having a friction surface surrounding said drum, said brake band friction surface comprising a lining of friction material, and an annular groove formed in said friction material in the region of said lubricating port whereby lubricating oil is distributed uniformly over the surface of said lining.

6. A clutch and brake assembly for use in a power transmission mechanism having gear elements capable of establishing plural torque delivery paths between a driving member and a driven member, a rotatable drum connected to one of said gear elements, a clutch member connected to said driving member, first clutch discs carried by said clutch member, second clutch discs carried within said drum, said discs being situated in interdigital relationship, fluid pressure operated servo means for engaging said discs to establish a driving connection between said one gear element and said driving member, axial grooves formed in said drum, an annular oil collecting groove formed in said drum and establishing fluid communication between said axial grooves, means for distributing lubricating oil to said discs whereby lubricating oil is forced under the influence of centrifugal pressure in a radially outward direction past said discs, a lubricating oil port formed in said drum and communicating with one of said axial grooves, a friction brake band having a friction surface surrounding said drum, the lubricating oil passing through said port being adapted to lubricate the friction surface of said band, and a second oil collecting groove formed in said drum at a location spaced axially from said first oil collecting groove, said lubricating oil port being situated between said oil collecting grooves.

7. In a power transmission system having relatively movable gear elements adapted to establish plural torque delivery paths between a driving member and a driven member, a multiple disc clutch assembly and a brake assembly, said clutch assembly and said brake assembly having a common drum, one element of said gearing being connected to said drum, a splined clutch element connected to said driving member, first clutch discs carried by said clutch element, spline grooves formed in said drum, clutch discs carried by said splined grooves in interdigital relationship with respect to said internally splined clutch discs, a brake band having a friction surface surrounding said drum, lubrication oil ports formed in said clutch element thereby admitting lubricating oil to the region of said discs, an oil collecting annular groove formed in said drum and establishing fluid communication between said spline grooves, a lubrication oil port extending radially through said drum from one of said spline grooves to a central region of said brake band, an oil distributing groove formed in the central region of said brake band and communicating with said lubricating oil ports thereby accommodating distribution of lubricating oil over the friction surface of said brake band, a snap ring groove formed in said drum at one end of said axially extending spline grooves, and a snap ring situated in said snap ring groove thereby sealing the ends of said grooves to allow the development of a centrifugal pressure build-up in the lubricating oil.

8. In a power transmission system having relatively movable gear elements adapted to establish plural torque delivery paths between a driving member and a driven member, a multiple disc clutch assembly and a brake band assembly, said clutch assembly and said brake assembly having a common drum, clutch means for delivering driving torque from said driving member to one element of said gearing, another element of said gearing being connected to said drum, an externally splined clutch element connected to said driving member, internally splined clutch discs carried by said clutch element, internally splined grooves formed in said drum, externally splined clutch discs carried by said splined grooves in interdigital relationship with respect to said internally splined clutch discs, a brake band having a friction surface surrounding said drum, lubrication oil ports formed in said clutch element thereby admitting lubricating oil to the region of said discs, an oil collecting annular groove formed in said drum and establishing fluid communication between said splined grooves, a lubrication oil port extending radially through said drum from one of said splined grooves to a central region of said brake band, a second oil collecting groove formed in the interior of said drum, each of said grooves establishing fluid communication between said splined grooves, said lubricating oil port being situated intermediate said oil collecting grooves, a snap ring groove formed in said drum at one end of said axially extending splined grooves, and a snap ring situated in said snap ring groove thereby sealing the ends of said grooves to allow the development of a centrifugal pressure build-up in the lubricating oil.

9. The combination as set forth in claim 4 wherein said drum has formed therein a snap ring groove at one end of said axially extending splined grooves, and a snap ring situated in said snap ring groove thereby sealing the ends of said grooves to allow the development of a centrifugal pressure build-up in the lubricating oil.

10. The combination as set forth in claim 5 wherein said drum includes a snap ring groove formed therein at one end of said axially extending splined grooves, and a snap ring situated in said snap ring groove thereby sealing the ends of said grooves to allow the development of a centrifugal pressure build-up in the lubricating oil.

11. The combination as set forth in claim 6 wherein said drum includes a snap ring groove formed therein at one end of said axially extending splined grooves, and a snap ring situated in said snap ring groove thereby sealing the ends of said grooves to allow the development of a centrifugal pressure build-up in the lubricating oil.

References Cited
UNITED STATES PATENTS

| | | | |
|---|---|---|---|
| 2,733,797 | 2/1956 | Almen et al. | 192—113 X |
| 3,202,253 | 8/1965 | Merritt et al. | 192—113 |

MARK NEWMAN, *Primary Examiner.*

ARTHUR T. McKEON, *Examiner.*